May 20, 1930. E. B. MOORE 1,759,060
VALVE
Filed July 24, 1928 2 Sheets-Sheet 1
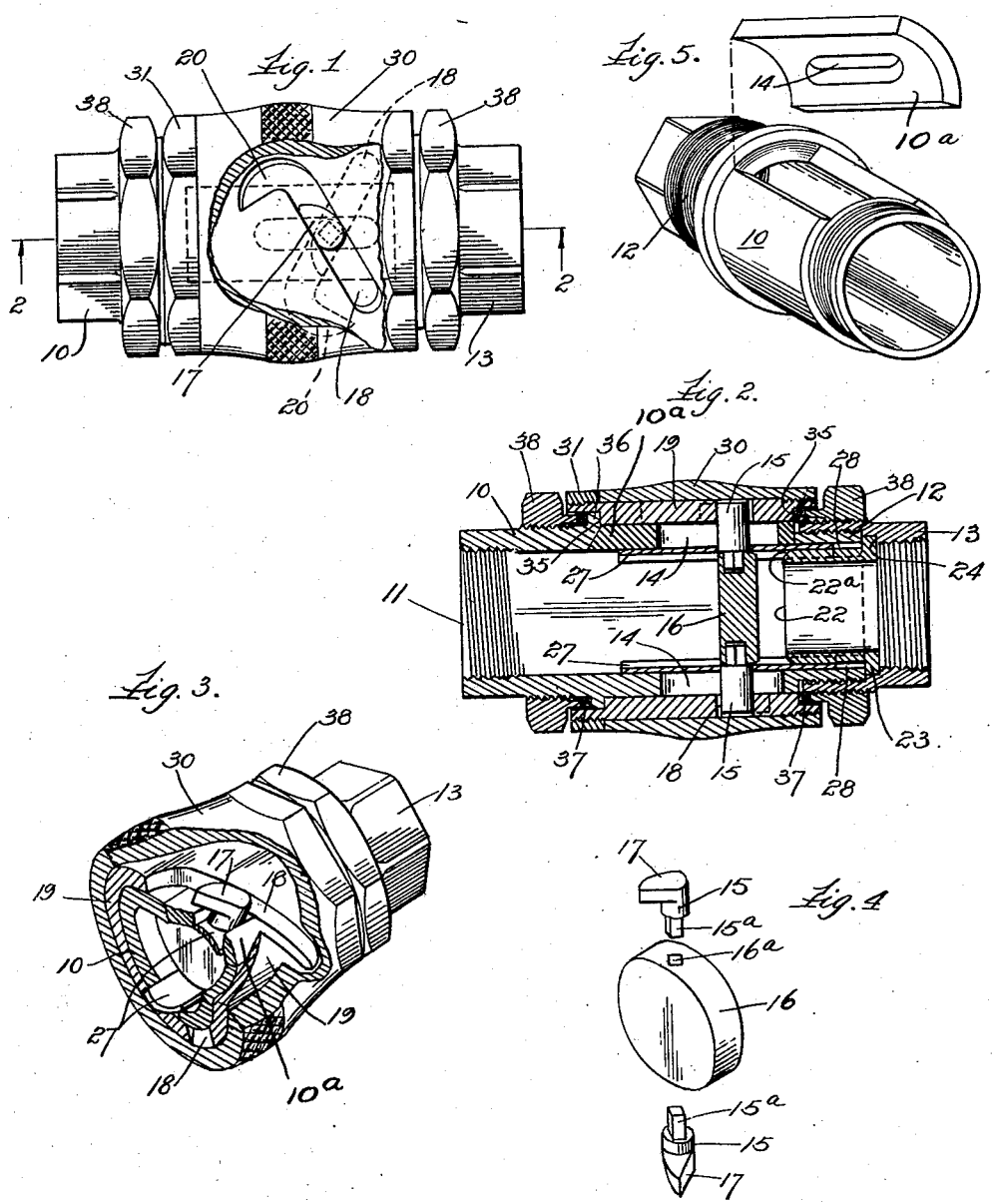
Inventor.
Emmett B. Moore.
by his Attorneys.

May 20, 1930.  E. B. MOORE  1,759,060
VALVE
Filed July 24, 1928   2 Sheets-Sheet 2
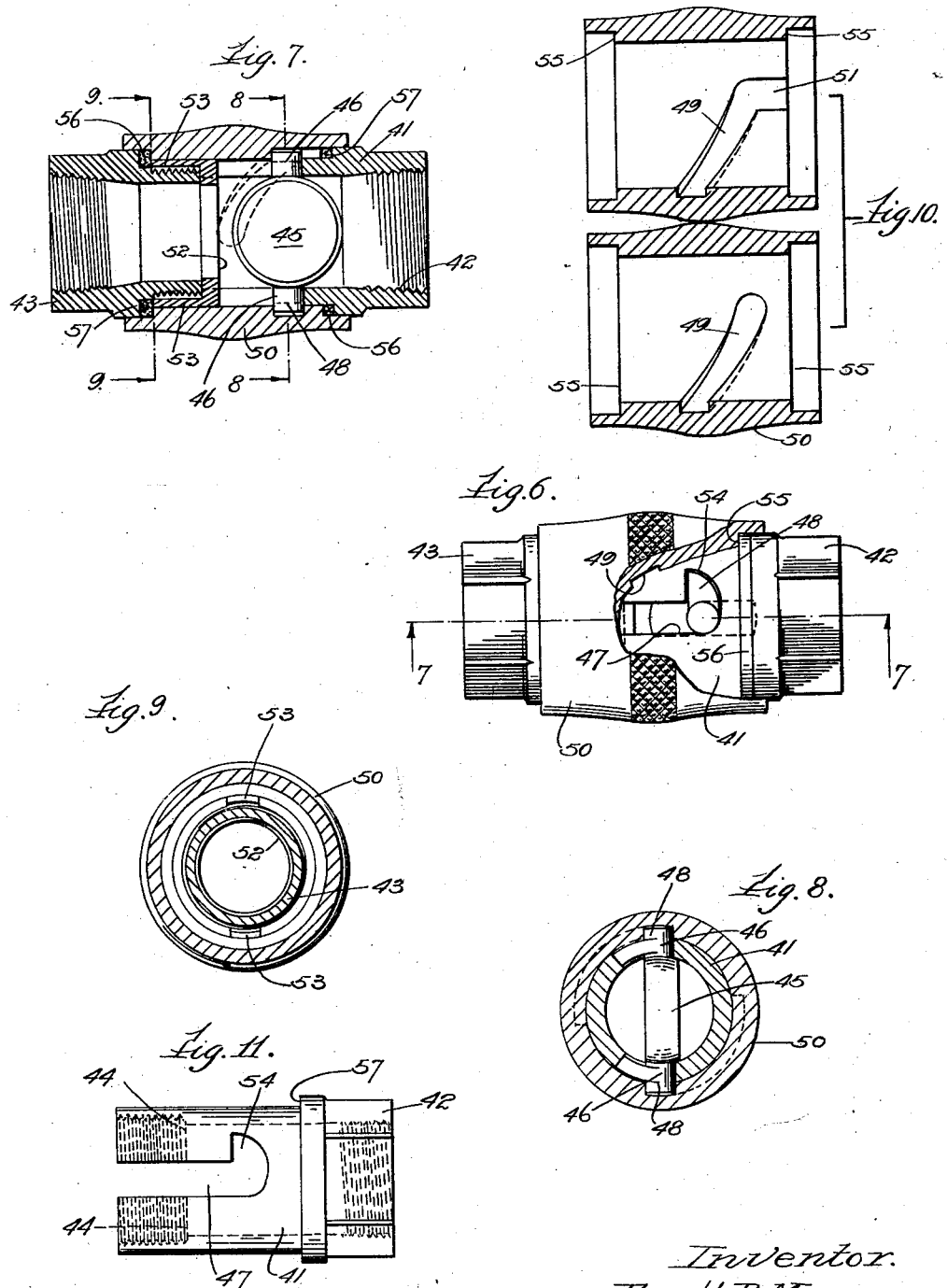
Inventor.
Emmett B. Moore.
by his Attorneys Patented May 20, 1930

1,759,060

UNITED STATES PATENT OFFICE

EMMETT B. MOORE, OF EVANSTON, ILLINOIS

VALVE

Application filed July 24, 1928. Serial No. 294,992.

This invention relates to valves employed in fluid pipe lines, and has for an object to provide a valve of improved construction, that is simple and positive in operation. Another object is to provide a valve of compact construction and capable of quick actuation. It consists in certain features and elements of construction, in combination, as herein shown and described, as indicated by the claims.

In the drawings:

Figure 1 is a plan view of a valve embodying my invention; parts of the outer shell being broken away to show details of construction.

Figure 2 is an axial section through the valve taken substantially as indicated at line, 2—2, on Fig. 1.

Figure 3 is a transverse section through the valve, taken in perspection; parts being broken away to show certain features of construction.

Figure 4 is a perspective view of the valve proper with the cam trunnions disassembled therefrom.

Figure 5 is a perspective view of the fixed inner sleeve and its removable insert pieces.

Figure 6 is a plan view of a valve of modified construction.

Figure 7 is a longitudinal sectional view taken substantially as indicated at line, 7—7, on Figure 6.

Figures 8 and 9 are transverse sections taken as indicated at lines, 8—8 and 9—9, respectively, on Figure 7.

Figure 10 is a sectional view taken diametrically through the operating sleeve; the opposite parts of the section being shown side by side to illustrate the arrangement of the grooved guideways.

Figure 11 is a plan view of the inner sleeve member of the valve.

The valve structure embodying the present invention includes a fixed or stationary inner sleeve, 10, having a coupling, 11, formed integral therewith by threading at one end, the other end of the sleeve being reduced in diameter at 12, on which is threaded a separable coupling, 13, (when the valve is completely assembled). Both the couplings have their outer surfaces shaped to facilitate engagement by a wrench or similar tool for mounting the valve in a pipe line; the parts being interiorly threaded for this purpose. The fixed inner sleeve is formed with a portion, $10^a$, of its peripheral wall removable, for a purpose which will hereinafter appear; said inner member is provided with a pair of diametrically opposite, longitudinally extending slots, 14, through which trunnions, 15, project outwardly from the valve, 16; one of the slots being formed in the removable insert piece, $10^a$. As shown, these trunnions may be detachable from the valve proper to facilitate assembly and simplify construction. The trunnions are provided with square shanks, $15^a$, engageable in square apertures, $16^a$, formed diametrically opposite each other in the edge of said valve. The outer ends of said trunnions are formed with a cam or follower, 17, extending outwardly beyond the fixed sleeve, 10, and engageable in slotted guideways, 18, formed in an operating sleeve, 19, which is rotatably mounted on the fixed inner sleeve, 10. The pair of guideways, 18, are positioned diametrically opposite each other and extend obliquely around said outer sleeve for about a quarter revolution; the extent of course being determined by the angular amount of obliquity of these guideways. The ends of these guideways, 18, adjacent the integral union, continue into terminal guideways, 20, which extend at substantially right angles to the respective oblique guideways. These terminal guideway portions extend in opposite directions from each other from their connecting guideway, 18, as shown in Figure 1, for causing the valve to be rotated to full open position.

It will now be clear that the relative rotation of the inner and outer sleeve moves the valve axially toward or away from its seat, 22, which is removably secured in the end of the inner sleeve; the cams being caused to traverse the oblique guideways, thus imparting parallel axial movement to the valve due to the trunnions shifting longitudinally in their slots, 14, in the inner sleeve. When the operating sleeve is rotated to its limit in one direction, the valve, 16, firmly engages its seat, and it will be clear that as the outer sleeve is rotated in opposite direction, the valve is backed away from the seat and as the outer sleeve approaches its other limit of rotation, the cams or followers are caused to turn into the terminal guideway portions, 20, thus causing rotation of the valve at right angles, or parallel to the direction of fluid flow through the device; the closing operation of the valve is exactly the reverse movement. As is now apparent, the valve structure is such as permits quick actuation of the valve in opening and closing; the operation requiring only a portion of a turn of the operating sleeve,—less than one quarter revolution; this feature will be frequently found very desirable. If desired, a cam need be provided on only one trunnion for rotating the valve as long as the other trunnion extends into the oblique guideway to insure positive and true movement of the valve toward or away from its seat.

As illustrated in the drawings the valve is of metal but it is to be understood that its seating surface may be fitted with any suitable material such as leather, cork, rubber, etc., which is of sufficient resiliency to insure a perfect seal against its seat, the particular material employed, of course, being especially suited to the conditions under which the valve is to be used. The valve seat is provided at the end opposite the valve with a peripheral flange, 23, abutting against the end of the inner sleeve for limiting the extent of inward protrusion. The opposite side of said flange is engaged by an interior shoulder, 24, formed in the separable coupling member, 13, for locking the valve seat in position. The removability of the valve seat facilitates assembly and dis-assembly of certain other parts of the valve structure and of course permits replacement of the part in the event of wear.

The seating end of valve seat, 22, opposite the flange, is conically tapered at 22ª, which serves a two-fold purpose. When the outer sleeve is rotated just enough to cause separation of the valve from its seat, permitting fluid flow, the fluid is deflected toward the valve proper, the pressure thereof tending to move the valve to full open position. After the valve has been moved sufficiently away from its seat the deflected fluid will not have any effect, but will flow through the valve seat. Ordinarily when a valve approaches its seat, a suction is likely to be set up drawing the valve rapidly against the seat in a hammering action. In my construction, when the valve approaches its seat, the surface, 22ª, deflects the fluid against the valve, thus cushioning the seating of the valve and eliminating the hammering action, which would otherwise result in undue wear and tear on the parts.

Slidably mounted against the inner periphery of the fixed sleeve member are a pair of shield members, 27, preferably of metal, shaped to conform to the inner contour of said sleeve; said shields being mounted on the trunnions, 15, on opposite sides of the valve, and axially movable with said valve when it is actuated. These shields are of sufficiently large size to completely overlap the guide slots, 14, in the inner sleeve, at any position of adjustment of the valve; the shields being provided with guidance throughout their entire range of movement of each having an end slidably engaged in a grooved guideway, 28, formed in the periphery of the valve seat, 22. Manifestly these shields check almost entirely the entry of the fluid of the system, into the slotted guideways, and also exclude grit and abrasives from entering these guideways and causing undue wear of the parts.

The flow of fluid through the slotted guideways, 18 and 20, in the operating sleeve, is prevented by an outer casing, 30, which is threaded at one end onto said outer sleeve, a lock nut, 31, threaded on the opposite end of the sleeve, locking the casing in place and completing the enclosure. The casing is shaped and knurled to afford proper hand grip for rotating the operating sleeve, thus actuating the valve. Of course the casing could be shaped for engagement by a wrench or other tool, or even be provided with a hand wheel to facilitate operation of the valve. It will be understood that the casing and outer sleeve could be an integral part, the guideways, 18, then being merely grooves, as shown in my modified construction, hereinafter described.

The rotating sleeve is provided with an integral shoulder, 35, at each end, the shoulder at one end being adapted to abut against the peripheral flange, 36, of the fixed sleeve, 10, for limiting its longitudinal movement in one direction. Packing gaskets 37, of any suitable material are provided to completely seal the valve against leakage; one of said gaskets being positioned to abut against the outside of flange, 36, and the inner periphery of the rotating sleeve at one end; at the other end the gasket is positioned against the shoulder, 35, and the inner periphery of the rotating sleeve, 19. These packing gaskets are firmly held in place by packing rings, 38, which are threaded on the couplings, 11 and 13. If preferred the packing rings may be threaded into the ends of the operating sleeve for rotation therewith.

The removable insert piece, 10ª, of the inner member, 10, facilitates assembly and dis-assembly of the entire structure. However, to further simplify construction, the valve with its trunnions and cams, may be made as an integral unit, which may be quickly positioned in the inner sleeve by the convenience of the removable insert piece 10ª. To use a valve with integral trunnions and two cams may necessitate providing a passageway from the guideways, 18, 20, which opens at one end of the outer sleeve so that the cams can be fed into operating position in said guideways. After a valve unit remains in service for a period of time it may become so corroded in places that it is very difficult to remove, and in some instances this would necessitate dismantling considerable equipment, although in most cases the valve proper is all that requires attention. In such a construction as above referred to, replacement of the valve may be accomplished very expeditiously, as it will only require removing the casing, 30, and sliding it to one side, then threading the outer sleeve in the direction to free the guideways from the cams; then by removing the insert piece, 10ª, the valve with the cams may be bodily removed and a new one substituted.

In the modified construction illustrated in Figures 5 to 10, the inner or fixed sleeve, 41, is also provided with an integral threaded coupling, 42, at one end, and the opposite end of said sleeve is enlarged in internal diameter, having a separable coupling, 43, threaded therein, said enlargement forming an outwardly facing shoulder 44. Mounted in said sleeve is a valve, 45, having integrally formed therewith a pair of diametrically oppositely extending trunnions, 46, projecting outwardly through slotted straight guideways, 47, which extend longitudinally of the fixed sleeve and open at the end thereof adjacent the separable coupling, 43. The trunnions are formed with integral cams or followers, 48, guided in said guideways, 47, and the upper ends of the trunnions extend beyond the fixed sleeve and cooperatively engage in a pair of diametrically opposite obliquely extending guideways, 49, in the form of grooves in the inner wall of an outer or operating sleeve, 50, rotatably mounted on said fixed sleeve. The grooves, 49, extend about one quarter turn around said sleeve, and one of the grooves merges into a terminal portion, 51, opening at one end of said sleeve as shown in Figure 10, to permit assembly of the valve structure. Thus, due to the rotation of the operating sleeve, the oblique guideways, 49, operating on the trunnions move the valve, 45, toward or from its seat, 52, under true guidance of the followers, 48, in the ways, 47, of the fixed sleeve. The closed ends of the slots, 47, merge into terminal slots 54, extending at right angles thereto, as shown in Figures 5 and 10, for engagement by the followers. When the valve has been moved away from its seat, for rotating the valve substantially at right angles to full flow position; this cam action also serving to rotate the valve transversely of the fluid flow before it is moved toward its seat.

The valve seat, 52, is removably mounted in said fixed sleeve, and positioned to abut against the shoulder, 44, the separable union, 43, engaging the opposite side of the valve seat for locking it in place. The valve seat is provide with a pair of diametrically opposite arms, 53, extending rearwardly from the outer periphery thereof and adapted to be slidably engaged in the open end portions of slots, 47, to hold the valve seat against rotation; these arms being of less thickness than the adjacent threaded portion of the fixed sleeve, so as not to interfere with the separable union when threaded in said fixed sleeve.

The operating sleeve is recessed internally in diameter at each end of the depth of the grooves, 49, thus forming outwardly facing shoulders, 55, at each end. Packing gaskets, 56, are positioned against said shoulders and in contact with the inner surfaces of projecting ends of the operating sleeve and are tightly held in place, the inwardly facing shoulders formed by the peripheral flanges, 57, formed on both the couplings, 42 and 43, thus sealing the valve against leakage. As may be seen in Figure 6, the flange on coupling, 42, through the packing gasket limits the movement of the operating sleeve in that direction and the flange on the separable union through its packing gasket locks the operating sleeve in position. The end portions of the sleeve preferably extend outwardly beyond the packing gasket, and the sleeve may be suitably shaped in contour for engagement and manipulation of the valve, being herein shown with a knurled bead around its center portion. Although in this modification I have shown and described a construction for suitably sealing the operating sleeve and inner fixed sleeve, against leakage, it may be preferred to alter the construction slightly to employ threaded packing rings for maintaining the packing gaskets in sealing position.

My improved valve structure is relatively compact and is especially suitable for use in close quarters, and is adapted to be actuated very quickly, requiring less than a quarter turn of the operating sleeve which is highly desirable in many instances. The valve actuating mechanism is designed to positively maintain the valve in any position of adjustment and will not be affected by the fluid pressure in the line. It will be apparent that the valve structure is adapted to accommodate more than the full flow of fluid for the size pipe for which it is designed. The construction is simple, permitting quick and easy assembly or dis-assembly, and the parts subject to most wear being made removable to permit replacement, thus prolonging the life of the entire valve structure.

I claim :—

1. In a valve structure of the character described, a stationary inner member, a valve seat therein, a valve movably supported in said inner member, a sleeve rotatably mounted on said member, and means responsive to the rotation of said sleeve for moving the valve axially with respect to its seat and adapted for rotating it transversely thereto.

2. In a valve structure of the character described, a stationary inner member, a valve seat therein, a valve movably supported in said inner member, a sleeve loosely mounted for rotation on said stationary member, and means responsive to the rotation of the sleeve for axially moving said valve toward or away from its seat and adapted for rotating the valve through approximately ninety degrees (90°), said means being arranged to provide guidance for said valve in its movement, and also being adapted to maintain said valve at any position of adjustment.

3. In a valve structure of the character described, a stationary inner member having a pair of opposite, longitudinally extending open guideways, a valve seat disposed in said member adjacent one end of said guideways, a valve movably mounted in said member having a pair of oppositely extending trunnions adapted to extend outwardly through said guideways, and a sleeve member rotatably mounted on said inner member, said sleeve having a pair of opposite diagonally extending guideways adapted to be engaged by said trunnions respectively whereby the rotation of said sleeve axially moves the valve toward or away from its seat.

4. In a valve structure as defined in claim 3, one guideway of one of said members continuing into a terminal guideway extending substantially at right angles thereto, a cam member on one of the trunnions, positioned for movement in said guideway and guideway terminal, whereby the rotation of the sleeve is adapted to cause the cam to be fed into or out of the terminal guideway for effecting an approximate ninety-degree (90°) rotation of the valve.

5. In a valve structure as defined in claim 3, one of the guideways of one of the members at the end opposite the valve seat continuing into a terminal guideway extending at substantially right angles thereto, a cam member on one of said trunnions positioned to engage in said guideway and guideway terminal, whereby the rotation of said sleeve causes the cam and trunnion to move the valve axially away from its seat and as said cam traverses the terminal guideway, said valve is rotated at approximately right angles.

6. In the combination defined in claim 3, shields mounted on the valve trunnions, on the inside of said stationary member, overlapping the open guideways.

7. In the combination defined in claim 3, shields mounted on the valve trunnions on the inner side of the stationary member, overlapping the elongated guideways, said shields being axially movable with the valve, and means for guiding such movement of the shields.

8. In a valve structure of the character described, a stationary inner member formed with a pair of opposite longitudinally extending slots, a valve seat in said member adjacent one end of said slots, a movable valve disposed in said member, said valve including a pair of oppositely extending trunnions projecting outwardly through the slots, one of said trunnions being provided with a cam, a sleeve rotatably mounted on said inner member provided with a pair of opposite, slotted guideways extending obliquely, one of said guideways having cooperative engagement with said cam and merging with a terminal guideway portion extending at approximately right angles thereto, whereby the rotation of said sleeve moves the valve away from its seat and rotates it transversely thereto, and means surrounding said sleeve for enclosing said slotted guideways therein.

9. In a valve structure as defined in claim 8, one of said trunnions being detachably removable from said valve.

10. In a valve structure of the character described, a stationary inner member having connecting means integrally formed therewith at one end, a valve seat removably mounted in the opposite end of said member, a coupling detachably connected to the other end of said member adapted for locking the valve seat in position, a valve movably mounted in said member, a sleeve rotatably mounted on said inner member, and means operably connecting said valve and sleeve whereby the rotation of said sleeve is adapted to cause actuation of the valve.

11. In a valve structure of the character described, a stationary inner member having a union, integrally formed therewith at one end; said member having an outwardly extending peripheral flange, a valve seat removably mounted in said member, a valve movably mounted in said member for cooperation with said seat; a sleeve rotatably mounted on said stationary member, means interconnecting said sleeve and valve whereby the rotation of the sleeve is adapted to cause actuation of the valve, said sleeve being formed with an inner peripheral shoulder adjacent each end, one of said shoulders being adapted to abut against said flange on the inner member for limiting endwise movement of said sleeve therein in one direction, a separate coupling threaded to said inner member adapted to lock said valve seat in position, and packing rings on said inner member adjacent the sleeve.

12. In the combination defined in claim 3, said inner member being formed with a removable body portion including one of the open guideways, to permit removal of said valve and trunnions.

13. In a valve structure for the purpose indicated, a stationary member having a longitudinal fluid passageway, a disk valve pivotally mounted in said passageway, said disk valve being dimensioned to substantially occupy the cross sectional area of said passageway, a sleeve rotatably mounted on said stationary member, and means responsive to the rotation of the sleeve for rotating the valve about a transverse axis in a plane parallel to the flow of fluid in said passageway.

14. In a valve structure for the purpose indicated a stationary member having a longitudinal fluid passageway provided with a valve seat therein, a disk valve pivotally mounted in said passageway about a transverse axis, said disk valve being dimensioned to substantially occupy the cross-sectional area of said passageway, a sleeve rotatably mounted on said stationary member, and connections between said sleeve and valve member (adapted in response to rotation of the sleeve) for first moving the valve axially away from its seat, and (upon continued rotation of said sleeve) for causing rotation of said valve about its transverse axis.

EMMETT B. MOORE.